US012225291B2

(12) United States Patent
Sennott

(10) Patent No.: US 12,225,291 B2
(45) Date of Patent: Feb. 11, 2025

(54) SYSTEM, METHOD, AND COMPUTER PROGRAM PRODUCT FOR ONLINE SENSOR MOTION COMPENSATION

(71) Applicant: FORD GLOBAL TECHNOLOGIES, LLC, Dearborn, MI (US)

(72) Inventor: Casey Sennott, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 452 days.

(21) Appl. No.: 17/591,049

(22) Filed: Feb. 2, 2022

(65) Prior Publication Data

US 2023/0247291 A1 Aug. 3, 2023

(51) Int. Cl.
*H04N 23/68* (2023.01)
*G01L 5/1627* (2020.01)
(Continued)

(52) U.S. Cl.
CPC ....... *H04N 23/6812* (2023.01); *G01L 5/1627* (2020.01); *G06N 20/00* (2019.01); *G06T 5/80* (2024.01); *G06T 7/80* (2017.01); *G06T 7/85* (2017.01); *H04N 17/002* (2013.01); *H04N 23/683* (2023.01); *H04N 23/90* (2023.01); *G03B 17/561* (2013.01); *G06T 2207/10012* (2013.01); *G06T 2207/20081* (2013.01);
(Continued)

(58) Field of Classification Search
None
See application file for complete search history.

(56) References Cited

U.S. PATENT DOCUMENTS 9,869,597 B1 * 1/2018 Reich .................... G01L 5/1627
10,630,889 B1 4/2020 Stout
(Continued)

FOREIGN PATENT DOCUMENTS

JP 2015108551 A * 6/2015

OTHER PUBLICATIONS

K. Hoffman, "3.2.2.2 Strain gage rosettes for the determination of stress conditions," in An Introduction to Measurements Using Strain Gauges, Darmstadt: Hottinger Baldwin Messtechnik, 1989, pp. 44-46 (Year: 1989).*
(Continued)

*Primary Examiner* — Vu Le
*Assistant Examiner* — Charles C L Penny
(74) *Attorney, Agent, or Firm* — Frank A. MacKenzie; Brooks Kushman P.C.

(57) ABSTRACT

Disclosed herein are system, method, and computer program product embodiments for online sensor motion compensation. For example, the method includes: applying a random mechanical excitation to a support structure, wherein a plurality of image capture devices and a plurality of sets of strain gauges are coupled to the support structure; measuring, with each set of strain gauges of the plurality of sets of strain gauges, simultaneous to the application of the random mechanical excitation, a strain; capturing, with each image capture device of the plurality of image capture devices, simultaneous to the application of the random mechanical excitation, a series of images of a calibration target; and generating, based on the strain and the series of images, a mapping between the strain and a displacement between the plurality of image capture devices.

20 Claims, 9 Drawing Sheets

(51) Int. Cl.
G03B 17/56 (2021.01)
G06N 20/00 (2019.01)
G06T 5/80 (2024.01)
G06T 7/80 (2017.01)
H04N 17/00 (2006.01)
H04N 23/90 (2023.01)

(52) U.S. Cl.
CPC ............ G06T 2207/20084 (2013.01); G06T 2207/20201 (2013.01); G06T 2207/30244 (2013.01)

(56) References Cited

U.S. PATENT DOCUMENTS

| | | |
|---|---|---|
| 2016/0187876 A1 | 6/2016 | Disperna et al. |
| 2017/0104979 A1 | 4/2017 | Shaw et al. |
| 2018/0053310 A1 | 2/2018 | Liu et al. |
| 2020/0204787 A1* | 6/2020 | Ardisana, II ......... H04N 13/246 |
| 2020/0294474 A1* | 9/2020 | Zurbrick ............ G02B 27/0172 |
| 2021/0118401 A1 | 4/2021 | Chi et al. |
| 2022/0046228 A1* | 2/2022 | Haskin ................ H04N 17/002 |
| 2022/0232197 A1* | 7/2022 | Scheja ................... G06T 7/593 |

OTHER PUBLICATIONS

R. Hartley, A. Zisserman, "Three-view geometry," Multiple View Geometry in Computer Vision, pp. 363-364, Mar. 2004. doi: 10.1017/cbo9780511811685.020 (Year: 2004).*

L. Fernandez, Method to measure, model, and predict depth and positioning errors of RGB-D Cameras in function of distance, velocity, and vibration. 2021. 118f. Tese (Doutorado em Engenharia Elétrica e de Computação)—Centro de Tecnologia, Universidade Federal do Rio Grande do Norte, Natal, 2021. (Year: 2021).*

International Search Report and Written Opinion of PCT/US2022/052269 mailed Apr. 25, 2023, 8 pages.

* cited by examiner

SYSTEM, METHOD, AND COMPUTER PROGRAM PRODUCT FOR ONLINE SENSOR MOTION COMPENSATION

BACKGROUND

Stereo camera systems that do not perform real-time, online recalibration rely on a time-invariant mathematical relationship between the positions of the two cameras to perform matching and depth estimation. This mathematical relationship (e.g., the position of one camera with respect to the other) is never truly time invariant in a mechanical system; thermal deflection, vibration, and shock can induce variations in sensor position over various timescales, and compromise the ability of the system to perform matching and depth estimation.

Existing stereo camera systems rely on solutions such as expensive, difficult to produce stable mechanical systems, computationally costly online recalibration algorithms, or computationally costly 2D matching algorithms to compensate for variation in the mechanical system during short-term disturbances and over the lifetime of the product.

SUMMARY

According to some non-limiting embodiments or aspects, provided is a method including: applying a random mechanical excitation to a support structure over a period of time, wherein a plurality of image capture devices and a plurality of sets of strain gauges are coupled to the support structure, and wherein the plurality of image capture devices are calibrated to each other before applying the random mechanical excitation to the support structure; measuring, with each set of strain gauges of the plurality of sets of strain gauges, simultaneous to the application of the random mechanical excitation to the support structure, a strain at a location of each set of strain gauges on the support structure over the period of time; capturing, with each image capture device of the plurality of image capture devices, simultaneous to the application of the random mechanical excitation to the support structure, image data associated with a series of images of a calibration target; and generating, with at least one processor, based on the strain measured at a location of each set of strain gauges on the support structure over the period of time by each set of strain gauges and the series of images of the calibration target captured by each image capture device, a mapping between the strain measured by each set of strain gauges and a displacement between the plurality of image capture devices.

In some non-limiting embodiments or aspects, the method further includes: capturing, with each image capture device, one or more further images; measuring, with each set of strain gauges, simultaneous to capturing the one or more images with each image capture device, a further strain at the location of each set of strain gauges on the support structure; applying, with the at least one processor, the mapping to the further strain measured by each set of strain gauges to generate a motion compensation parameter associated with a predicted displacement between the plurality of image capture devices for calibrating the one or more further images captured by each image capture device; and correcting, with the at least one processor, using the motion compensation parameter, a distortion between the one or more further images captured by each image capture device.

In some non-limiting embodiments or aspects, each set of strain gauges includes three strain gauges, and wherein the three strain gauges are in a delta-rosette configuration.

In some non-limiting embodiments or aspects, the plurality of image capture devices includes at least three image capture devices.

In some non-limiting embodiments or aspects, the support structure includes a first face facing in a first direction and a second face facing in a second direction different than the first direction, wherein at least one first set of strain gauges of the plurality of sets of strain gauges is coupled to the first face of the support structure, and wherein at least one second set of strain gauges of the plurality of sets of strain gauges is coupled to the second face of the support structure.

In some non-limiting embodiments or aspects, the mapping includes a machine learning model, and wherein generating the mapping includes training the machine learning model using the strain measured over the period of time by each set of strain gauges and the series of images captured by each image capture device to generate a predicted displacement between the plurality of image capture devices.

In some non-limiting embodiments or aspects, the strain at the location of each set of strain gauges on the support structure over the period of time is measured as a series of strain tensors corresponding to the series of images of the calibration target, and wherein each strain tensor of the series of strain tensors is measured with six degrees of freedom.

According to some non-limiting embodiments or aspects, provided is a system including: a support structure; a plurality of image capture devices coupled to the support structure; a plurality of sets of strain gauges coupled to the support structure; a memory; and at least one processor coupled to the memory and configured to: receive a strain measured over a period of time, at a location of each set of strain gauges of the plurality of sets of strain gauges coupled to the support structure, simultaneous to an application of a random mechanical excitation to the support structure over the period of time, wherein the plurality of image capture devices are calibrated to each other before the random mechanical excitation is applied to the support structure; receive image data associated with a series of images of a calibration target captured, by each image capture device of the plurality of image capture devices, simultaneous to the application of the random mechanical excitation to the support structure; and generate, based on the strain measured over the period of time by each set of strain gauges and the image data associated with the series of images of the calibration target captured by each image capture device, a mapping between the strain measured by each set of strain gauges and a displacement between the plurality of image capture devices.

In some non-limiting embodiments or aspects, the at least one processor coupled to the memory is further configured to: receive further image data associated with one or more further images captured by each image capture device; receive a further strain measured, by each set of strain gauges, simultaneous to the capture of the one or more images by each image capture device; apply the mapping to the further strain measured by each set of strain gauges to generate a motion compensation parameter associated with a predicted displacement between the plurality of image capture devices for calibrating the one or more further images captured by each image capture device; and correct, using the motion compensation parameter, a distortion between the one or more further images captured by each image capture device.

In some non-limiting embodiments or aspects, each set of strain gauges includes three strain gauges, and wherein the three strain gauges are in a delta-rosette configuration.

In some non-limiting embodiments or aspects, the plurality of image capture devices includes at least three image capture devices.

In some non-limiting embodiments or aspects, the support structure includes a first face facing in a first direction and a second face facing in a second direction different than the first direction, wherein at least one first set of strain gauges of the plurality of sets of strain gauges is coupled to the first face of the support structure, and wherein at least one second set of strain gauges of the plurality of sets of strain gauges is coupled to the second face of the support structure.

In some non-limiting embodiments or aspects, the mapping includes a machine learning model, and wherein generating the mapping includes training the machine learning model using the strain measured over the period of time by each set of strain gauges and the image data associated with the series of images captured by each image capture device to generate a predicted displacement between the plurality of image capture devices.

In some non-limiting embodiments or aspects, the strain at the location of each set of strain gauges on the support structure over the period of time is measured as a series of strain tensors corresponding to the series of images of the calibration target, and wherein each strain tensor of the series of strain tensors is measured with six degrees of freedom.

According to some non-limiting embodiments or aspects, provided is a non-transitory computer-readable medium having instructions stored thereon that, when executed by at least one computing device, cause the at least one computing device to perform operations comprising: receiving a strain measured over a period of time, at a location of each set of strain gauges of a plurality of sets of strain gauges coupled to a support structure, simultaneous to an application of a random mechanical excitation to the support structure over the period of time, wherein a plurality of image capture devices are coupled to the support structure, and wherein the plurality of image capture devices are calibrated to each other before the random mechanical excitation is applied to the support structure; receiving image data associated with a series of images of a calibration target captured, by each image capture device of the plurality of image capture devices, simultaneous to the application of the random mechanical excitation to the support structure; generating, based on the strain measured over the period of time by each set of strain gauges and the image data associated with the series of images of the calibration target captured by each image capture device, a mapping between the strain measured by each set of strain gauges and a displacement between the plurality of image capture devices; receiving further image data associated with one or more further images captured by each image capture device; receiving a further strain measured, by each set of strain gauges, simultaneous to the capture of the one or more images by each image capture device; applying the mapping to the further strain measured by each set of strain gauges to generate a motion compensation parameter associated with a predicted displacement between the plurality of image capture devices for calibrating the one or more further images captured by each image capture device; and correcting, using the motion compensation parameter, a distortion between the one or more further images captured by each image capture device.

In some non-limiting embodiments or aspects, each set of strain gauges includes three strain gauges, and wherein the three strain gauges are in a delta-rosette configuration.

In some non-limiting embodiments or aspects, the plurality of image capture devices includes at least three image capture devices.

In some non-limiting embodiments or aspects, the support structure includes a first face facing in a first direction and a second face facing in a second direction different than the first direction, wherein at least one first set of strain gauges of the plurality of sets of strain gauges is coupled to the first face of the support structure, and wherein at least one second set of strain gauges of the plurality of sets of strain gauges is coupled to the second face of the support structure.

In some non-limiting embodiments or aspects, the mapping includes a machine learning model, and wherein generating the mapping includes training the machine learning model using the strain measured over the period of time by each set of strain gauges and the image data associated with the series of images captured by each image capture device to generate a predicted displacement between the plurality of image capture devices.

In some non-limiting embodiments or aspects, the strain at the location of each set of strain gauges on the support structure over the period of time is measured as a series of strain tensors corresponding to the series of images of the calibration target, and wherein each strain tensor of the series of strain tensors is measured with six degrees of freedom.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for online sensor motion compensation. Non-limiting embodiments or aspects may use low-cost strain sensors, embedded signal conditioning, and/or an improved calibration method to generate an externally-readable feedback signal that can provide online sensor motion compensation. Non-limiting embodiments or aspects may enable the use of a support structure for image capture devices (e.g., a mechanical stereo bracket assembly, etc.) that need not be extremely stiff and thermally stable (e.g., a support structure that instead generates repeatable deformations under thermal and vibration loading, etc.), which is a much more tractable engineering goal, and can be achieved with typical metals or other crystalline materials, thereby reducing mechanical complexity and manufacturing cost for a stereo camera assembly. Non-limiting embodiments or aspects may enable the use of lower cost and more widely available strain sensors and corresponding signal conditioning hardware (e.g., similar to a typical load cell, etc.) for performing online motion compensation. Non-limiting embodiments or aspects may provide for a mapping between mechanical displacements and any calibration metric desired, which may enable online compensation to be extended to a variety of geometries or sensor configurations, such as three or more cameras, a camera LiDAR device combination, a tiara geometry of an autonomous vehicle, and/or the like.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Figure 1:
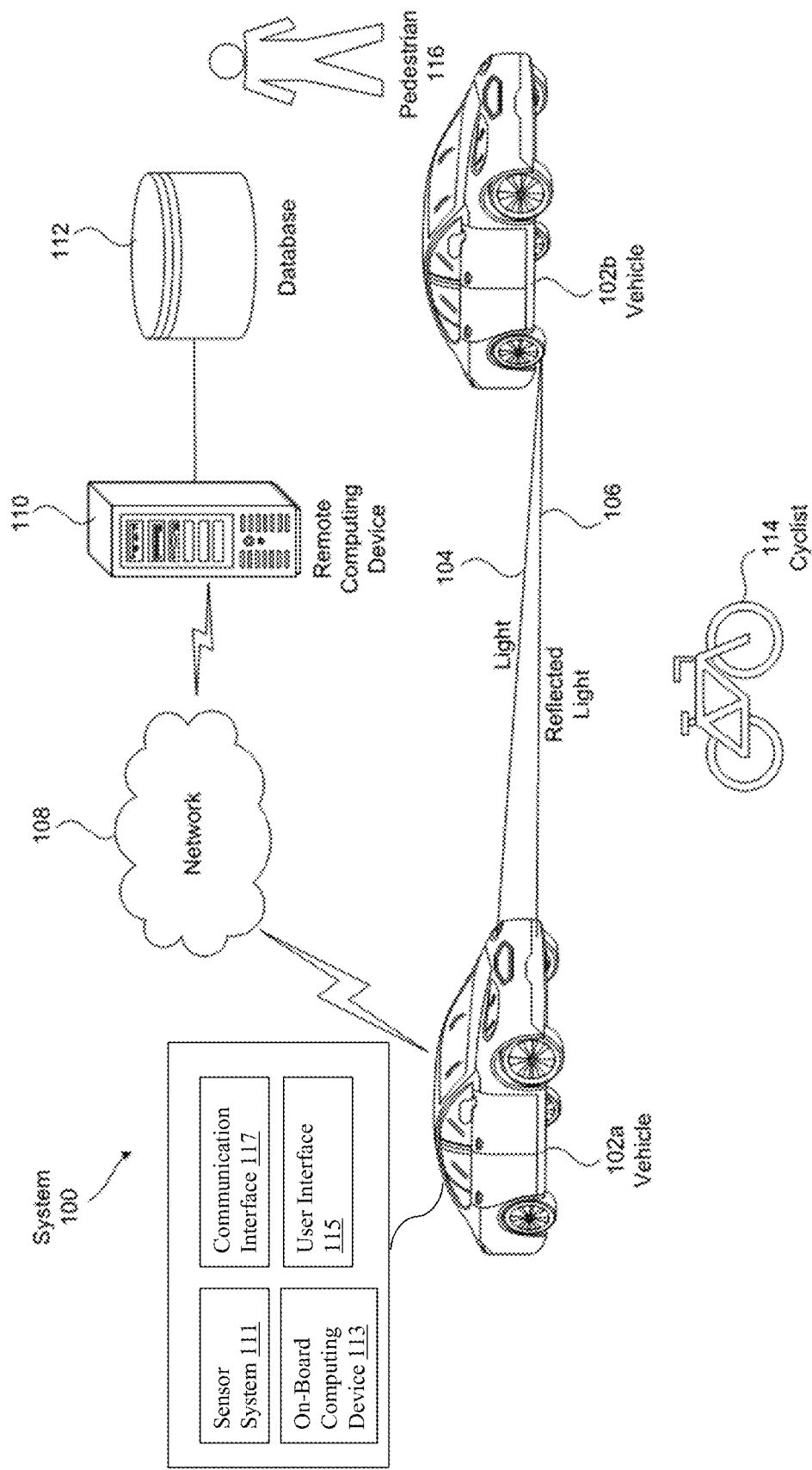
FIG. 1 illustrates an exemplary autonomous vehicle system, in accordance with aspects of the disclosure.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, and 116 in proximity thereto. The objects can include, but are not limited to, a vehicle 102b, a cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
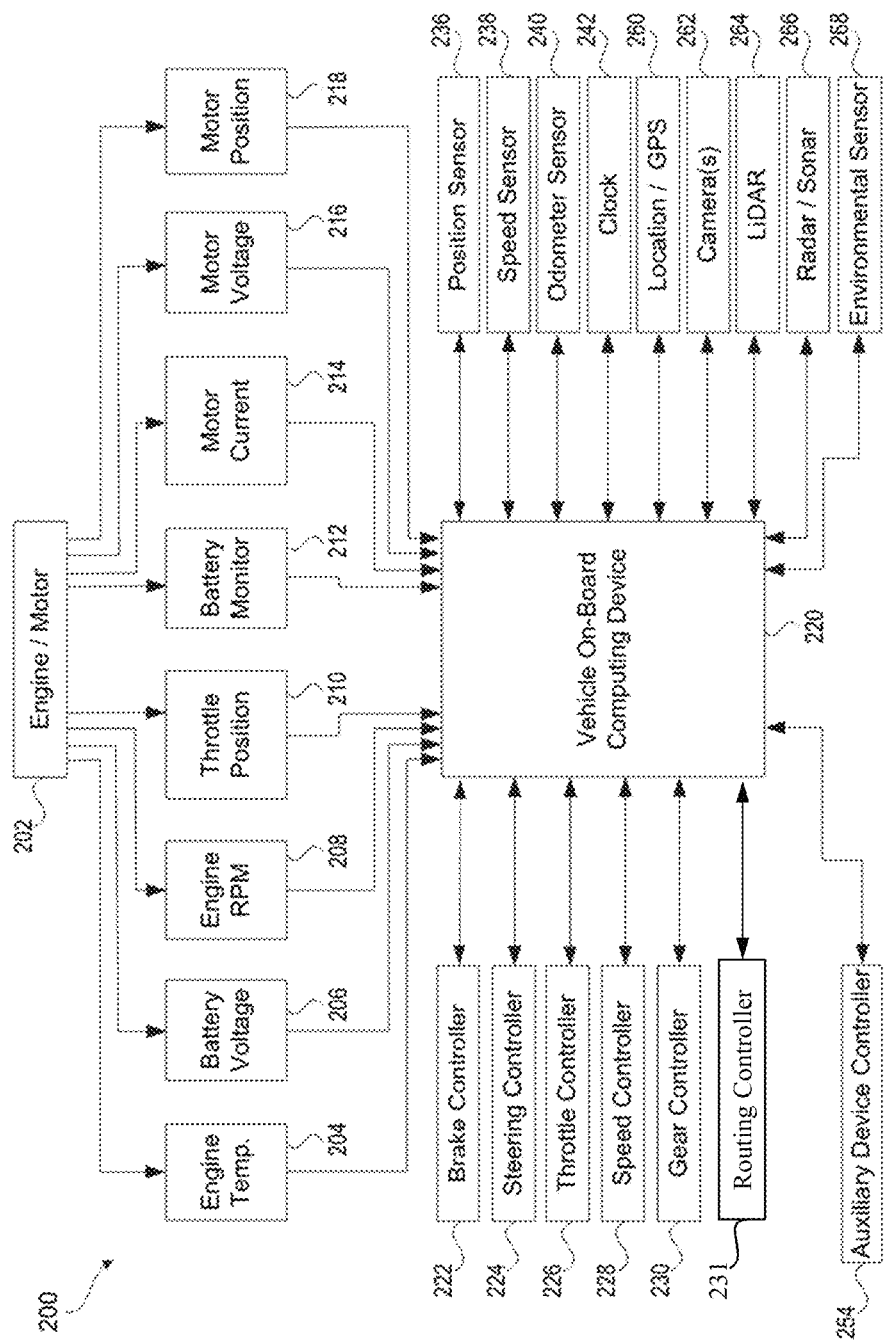
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a LiDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a LiDAR system, e.g., LiDAR system 264 of FIG. 2. The LiDAR system may be configured to transmit a light pulse 104 to detect objects located within a distance or range of distances of AV 102a. Light pulse 104 may be incident on one or more objects (e.g., AV 102b) and be reflected back to the LiDAR system. Reflected light pulse 106 incident on the LiDAR system may be processed to determine a distance of that object to AV 102a. The reflected light pulse 106 may be detected using, in some embodiments, a photodetector or array of photodetectors positioned and configured to receive the light reflected back into the LiDAR system. LiDAR information, such as detected object data, is communicated from the LiDAR system to an on-board computing device, e.g., on-board computing device 220 of FIG. 2. The AV 102a may also communicate LiDAR data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the LiDAR systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a LiDAR system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 220. The on-board computing device 220 may implemented using the computer system of FIG. 9. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, and mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR system 264 is communicated from those sensors) to the on-board computing device 220. The object detection information and/or captured images are processed by the on-board computing device 220 to detect objects in proximity to the vehicle. Any known or to be known technique for making an object detection based on sensor data and/or captured images can be used in the embodiments disclosed in this document.

LiDAR information is communicated from LiDAR system 264 to the on-board computing device 220. Additionally, captured images are communicated from the camera(s) 262 to the vehicle on-board computing device 220. The LiDAR information and/or captured images are processed by the vehicle on-board computing device 220 to detect objects in proximity to the vehicle. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102*a*. The perception information may represent what an ordinary driver would perceive in the surrounding environment of a vehicle. The perception data may include information relating to one or more objects in the environment of the AV 102*a*. For example, the on-board computing device 220 may process sensor data (e.g., LiDAR or RADAR data, camera images, etc.) in order to identify objects and/or features in the environment of AV 102*a*. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102*a*, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102*a* that best navigates the autonomous vehicle relative to the objects at their future locations.

In some embodiments, the on-board computing device 220 may receive predictions and make a decision regarding how to handle objects and/or actors in the environment of the AV 102*a*. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102*a* to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102*a*. If the risk exceeds an acceptable threshold, it may determine whether the collision can be avoided if the autonomous vehicle follows a defined vehicle trajectory and/or implements one or more dynamically generated emergency maneuvers performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
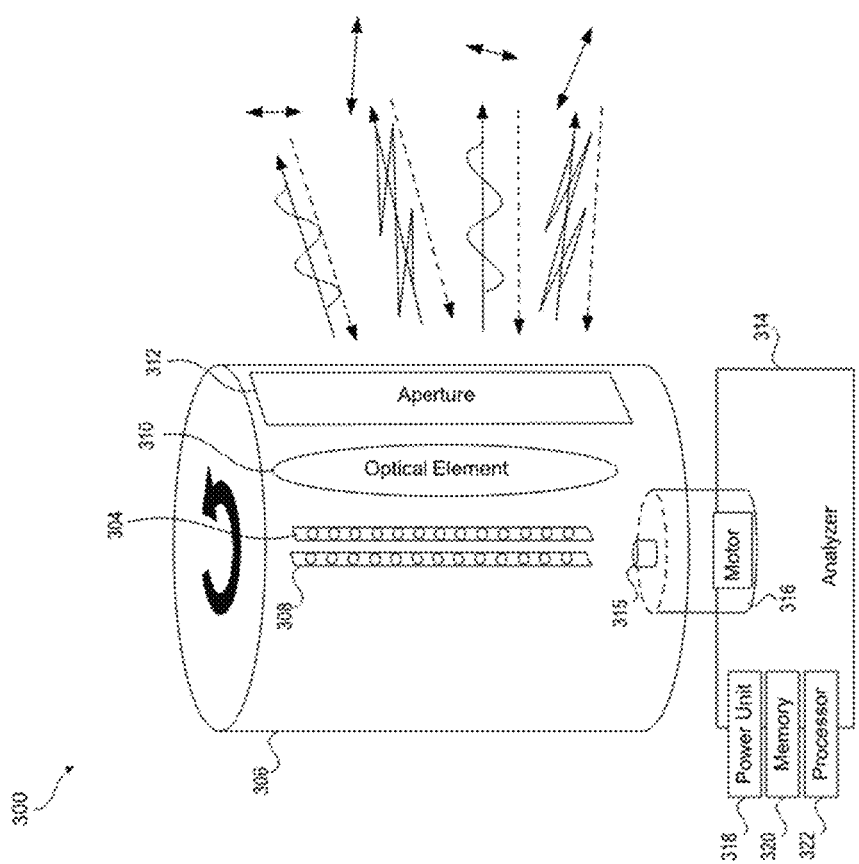
FIG. 3 illustrates an exemplary architecture for a Light Detection and Ranging ("LiDAR") system, in accordance with aspects of the disclosure.

FIG. 3 illustrates an exemplary architecture for a LiDAR system 300, in accordance with aspects of the disclosure. LiDAR system 264 of FIG. 2 may be the same as or substantially similar to the LiDAR system 300. As such, the discussion of LiDAR system 300 is sufficient for understanding LiDAR system 264 of FIG. 2. It should be noted that the LiDAR system 300 of FIG. 3 is merely an example LiDAR system and that other LiDAR systems are further completed in accordance with aspects of the present disclosure, as should be understood by those of ordinary skill in the art.

As shown in FIG. 3, the LiDAR system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The LiDAR system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

LiDAR system 300 includes a power unit 318 to power the light emitting unit 304, a motor 316, and electronic components. LiDAR system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
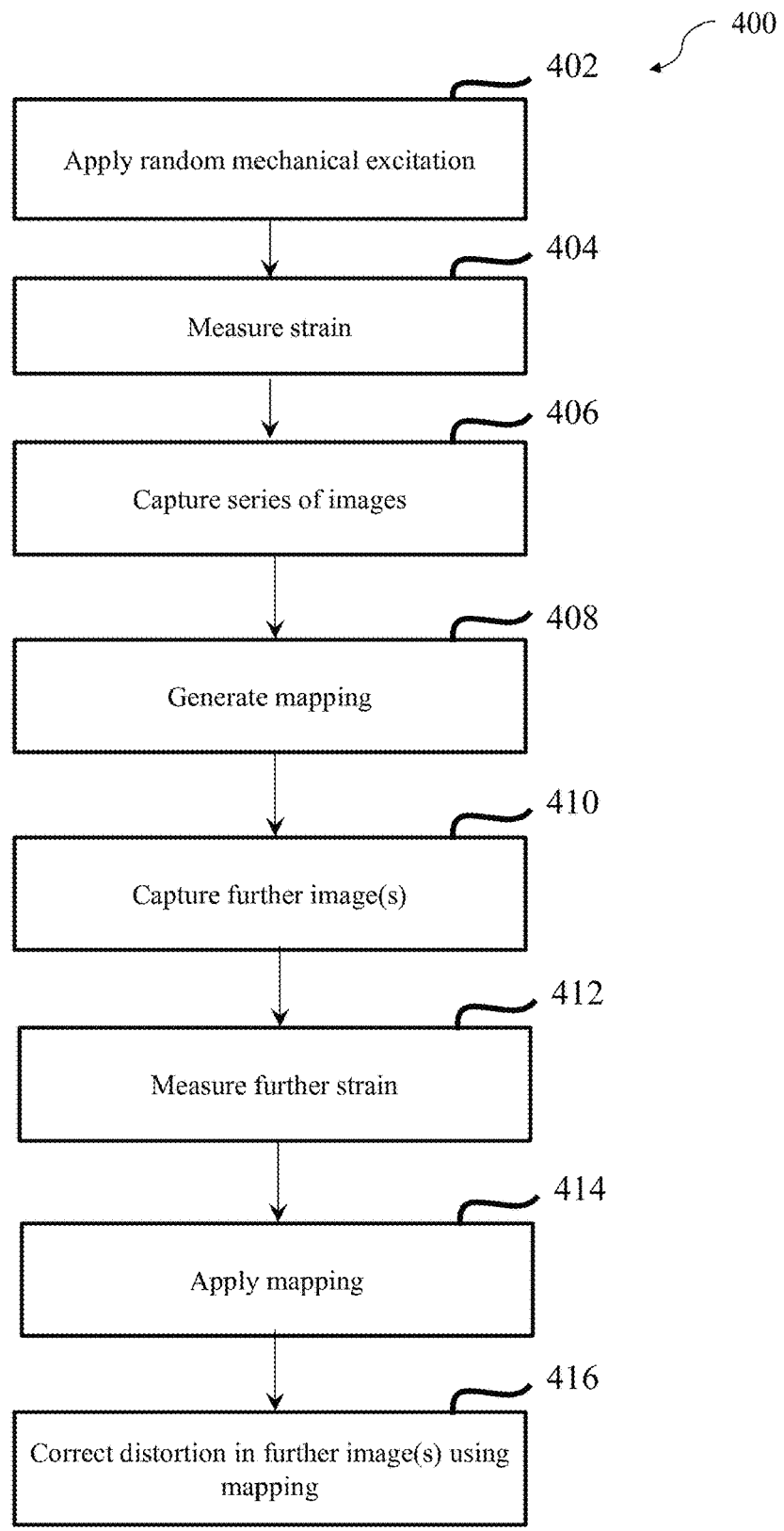
FIG. 4 illustrates an exemplary process for online sensor motion compensation, in accordance with aspects of the disclosure.

Referring now to FIG. 4, FIG. 4 illustrates an exemplary process 400 for online sensor motion compensation, in accordance with aspects of the disclosure.

Figure 5:
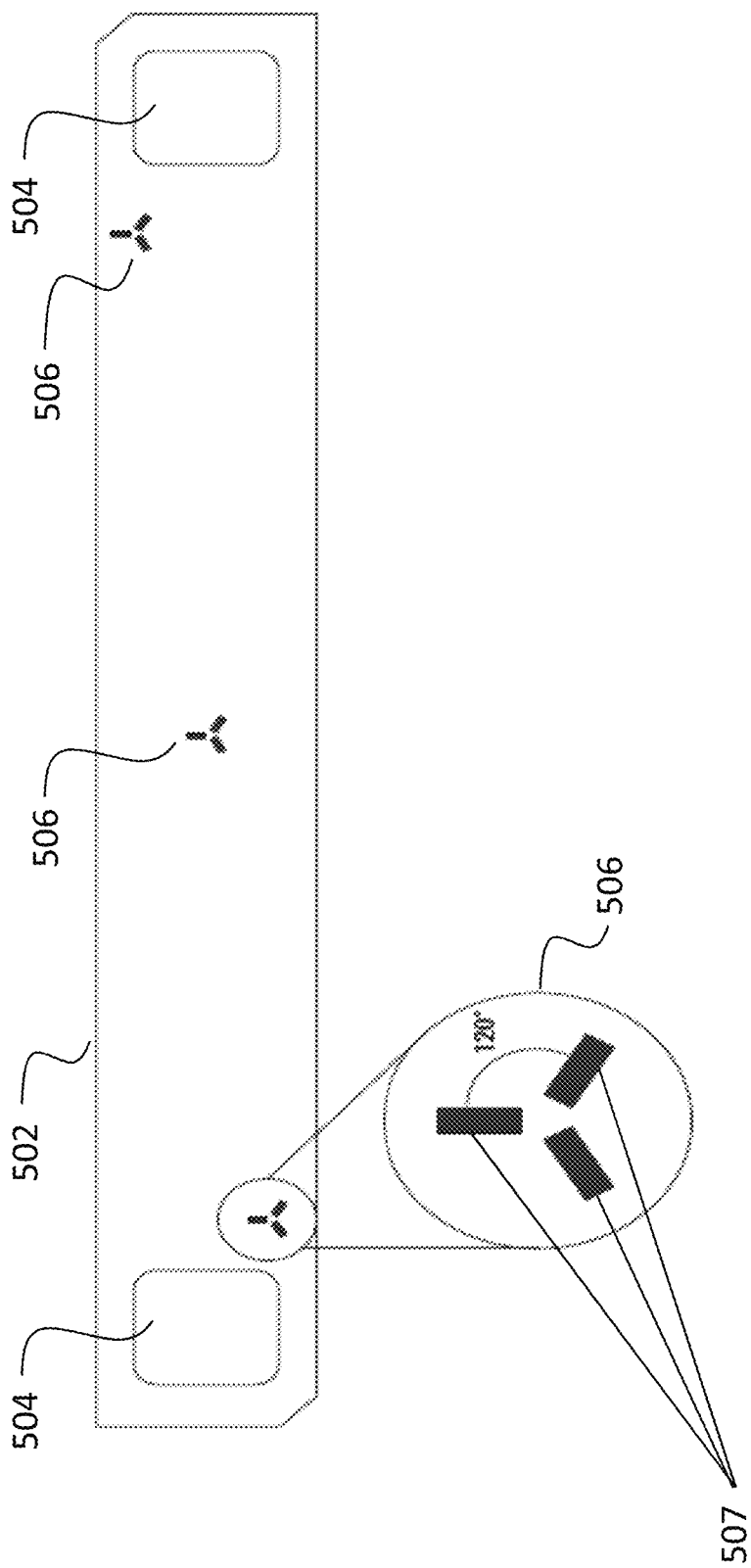
FIG. 5 illustrates an exemplary image capture system, in accordance with aspects of the disclosure.
Figure 6:
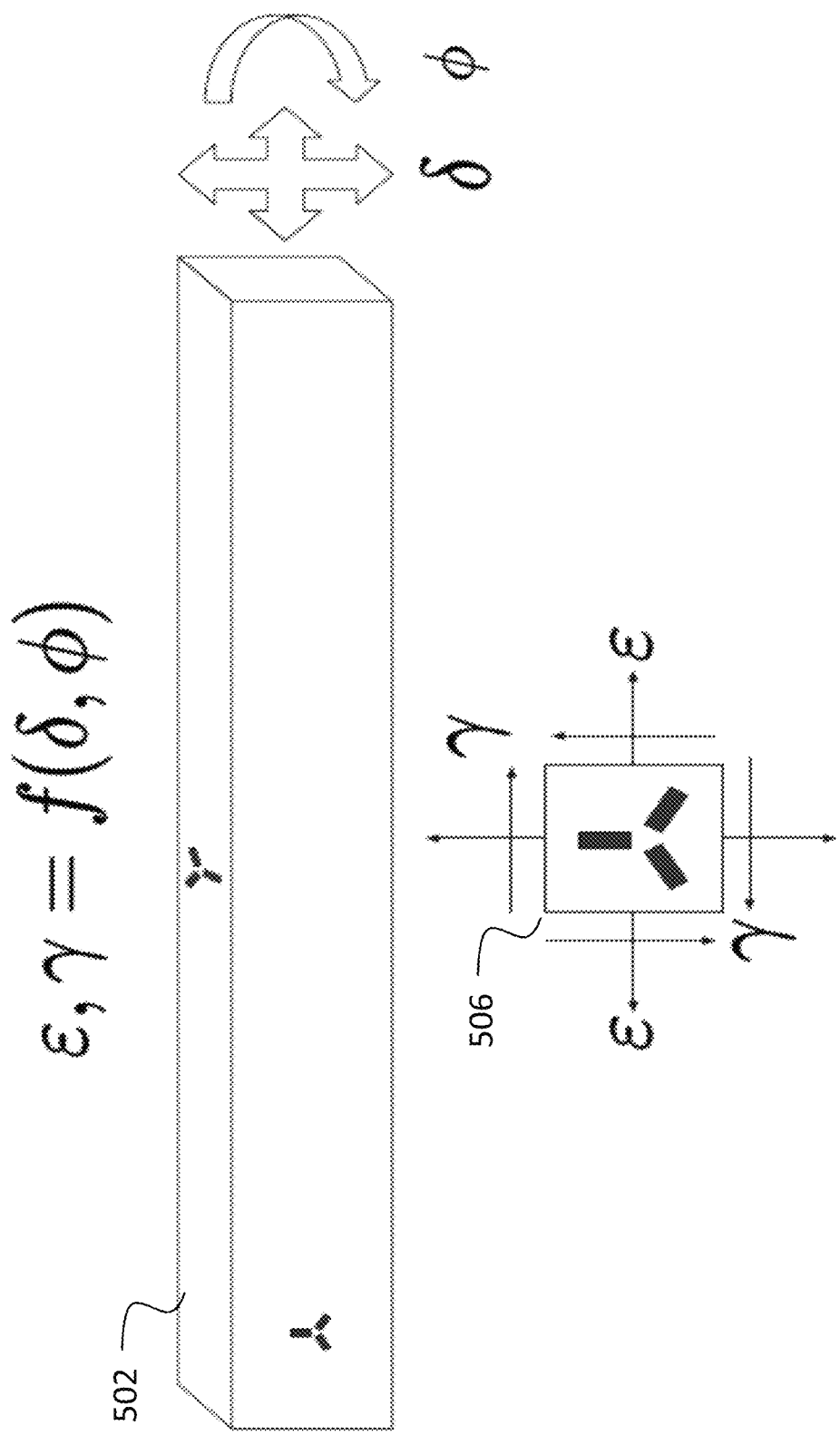
FIG. 6 illustrates an exemplary representation of strain state, in accordance with aspects of the disclosure.
Figure 7:
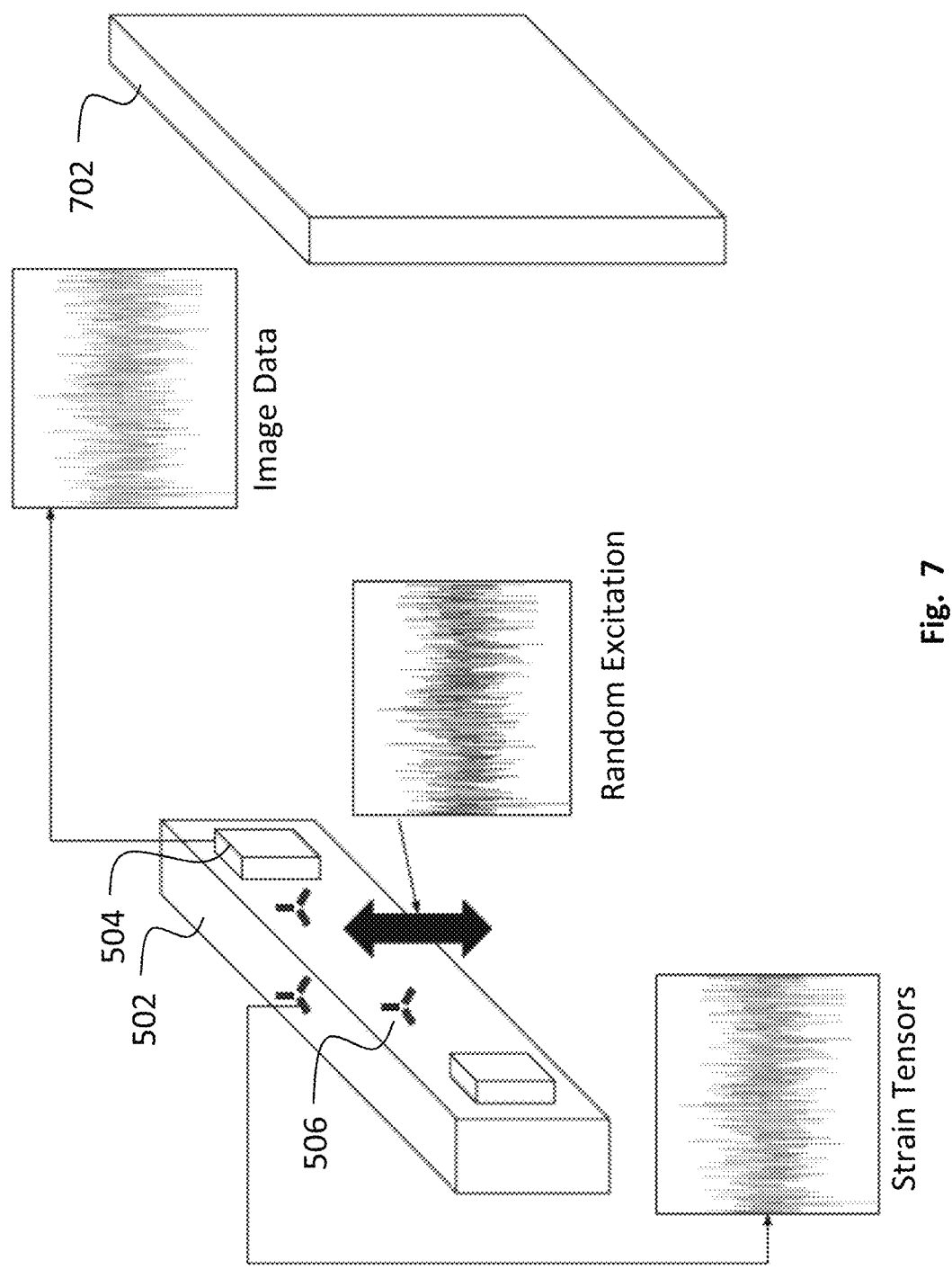
FIG. 7 illustrates an exemplary architecture for image capture system calibration system, in accordance with aspects of the disclosure.
Figure 8:
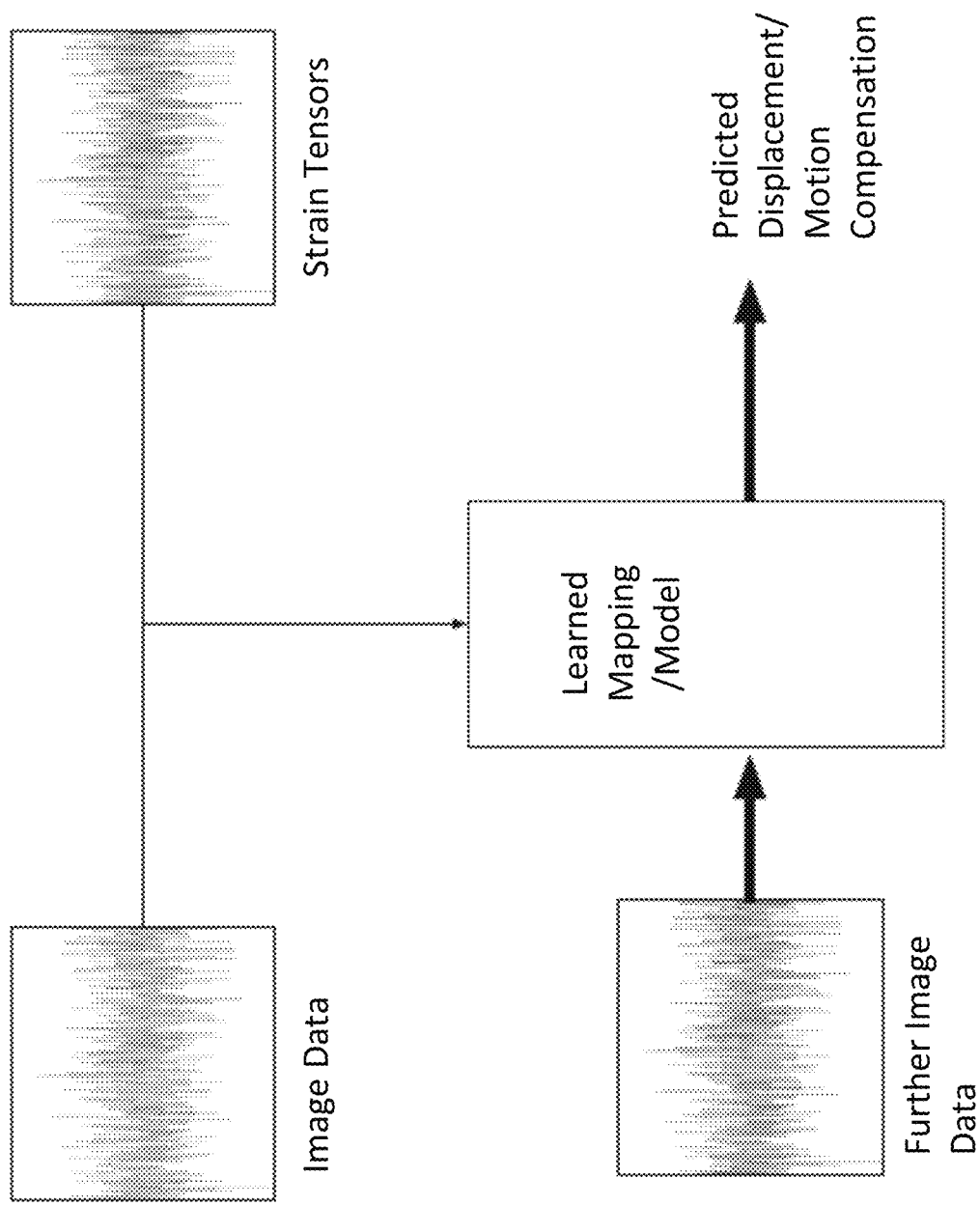
FIG. 8 illustrates an exemplary process for online sensor motion compensation, in accordance with aspects of the disclosure.

As shown in FIG. 4, at step 402, process 400 includes applying a random mechanical excitation to a support structure over a period of time. For example, and referring also to FIGS. 5-7, a computer system (e.g., computer system 900, etc.) may apply a random mechanical excitation to support structure 502 over a period of time. As an example, a computer system may control a mechanical exciter (e.g., a vibration exciter, etc.) to apply a random mechanical excitation to support structure 502 over a period of time.

Support structure 502 may include a homogeneous bracket assembly (e.g., a homogenous stereo bracket assembly, etc.). However, non-limiting embodiments or aspects of the present disclosure are not limited thereto, and support structure 502 may include a component of AV 102a (e.g., a door, a hood, a bumper, a sensor tiara or housing 306 of LiDAR system 300, etc.) or any other structure capable of supporting a plurality of image capture devices and/or a plurality of sets of strain gauges. As an example, support structure 502 may include a roof of an autonomous vehicle as disclosed in U.S. Pat. No. 11,112,490, issued Sep. 7, 2021, the entire contents of which are incorporated by reference. Further, one or more steps of process 400 may be performed before support structure 502 is part of AV 102a and/or mounted thereto, and/or one or more steps of process 400 may be performed after support structure 502 is part of AV 102a and/or mounted thereto.

A plurality of image capture devices 504 and a plurality of sets of strain gauges 506 may be coupled (e.g., rigidly coupled, etc.) to support structure 502. The plurality of image capture devices 504 may be calibrated to each other (e.g., via a calibration parameter, etc.) before applying the random mechanical excitation to support structure 502. For example, poses or location in six degrees of freedom of the plurality of image capture devices 504 may be pre-calibrated to each other.

The plurality of image capture devices 504 may include two or more image capture devices (e.g., a stereo image capture device, three or more image capture devices, a camera and a LiDAR system, etc.). An image capture device 504 may include a camera, a LiDAR system (e.g., LiDAR system 264, etc.), and/or the like.

Each set of strain gauges 506 may include a plurality of strain gauges 507. For example, each set of strain gauges 506 may include three strain gauges 507, and the three strain gauges 507 may be in a delta-rosette configuration (e.g., with each strain gauge 507 at a maximum angular dispersion of 120°, etc.). As an example, and referring specifically to FIG. 6, a set of strain gauges 506 including a three strain gauge rosette may fully define a 2-dimensional (2D) strain tensor $\varepsilon, \gamma$ at a location of the set of strain gauges 506 as a function, which may be nonlinear, of a general six degrees of freedom displacement $\delta, \varphi$ of support structure 502 (e.g., at a beam end of support structure, etc.), for example, as $\varepsilon, \gamma = f(\delta, \varphi)$. In such an example, a strain state at the plurality of sets of strain gauges 506 may be a function of the displacement of the plurality of image capture devices 504 because the image capture devices 504 may be rigidly coupled to support structure 502, and each set of strain gauges 506 may generate a 2D strain tensor at that location of support structure 502 (e.g., at the surface to which the set of strain gauges 506 is coupled, etc.), which may be a unique function of the displacement.

However, non-limiting embodiments or aspects of the present disclosure are not limited thereto, and each set of strain gauges 506 may include any number of strain gauges 507 (e.g., four or more strain gauges 507, etc.), and the strain gauges 507 may be in any configuration (e.g., a tee configuration, a rectangular configuration, a rectangular rosette, etc.). A material of each strain gauge 507 may be selected to be highly resistant to thermal creep within the functional temperature range of a system. For example, a creep in the strain gauges 507 may be registered as a displacement signal from the support structure 502, which may lead to spurious results. In some non-limiting embodiments or aspects, a bridge configuration of the strain gauges 507 and a free reference gauge may be used to provide temperature compensation so that signals generated by thermal expansion of the material of the strain gauges 507 may be filtered or rejected.

Support structure 502 may include a first face facing in a first direction (e.g., the face to which cameras 262 are coupled to in FIG. 7, etc.) and a second face (the face facing upwards in FIG. 7, etc.) facing in a second direction different than the first direction (e.g., a direction perpendicular to the first direction, etc.), and at least one first set of strain gauges of the plurality of sets of strain gauges 506 may be coupled to the first face of the support structure 502, and at least one second set of strain gauges of the plurality of sets of strain gauges 506 may be coupled to the second face of the support structure 502. For example, support structure 502 may include a plurality of faces or surfaces facing in a plurality of different directions, and the plurality of sets of strain gauges 506 may be coupled to two or more faces of the plurality of faces of support structure 502.

As shown in FIG. 4, at step 404, process 400 includes measuring strain over the period of time. For example, and referring again to FIGS. 6 and 7, each set of strain gauges 506 of the plurality of sets of strain gauges 506 may measure, simultaneous to the application of the random mechanical excitation to the support structure 502, a strain at a location of each set of strain gauges on the support structure over the period of time. As an example, each set of strain gauges 506 of the plurality of sets of strain gauges 506 may measure, simultaneous to the application of the random mechanical excitation to the support structure, a time series of 2D strain tensors (e.g., 2×2 matrix, etc.) at a location of each set of strain gauges on the support structure during the period of time over which the random mechanical excitation is applied to the support structure 502. In such an example, each set of strain gauges 506 of the plurality of sets of strain gauges 506 may measure, for each time stamp of a series of time stamps (e.g., for each image of a series of images of a calibration target captured by the plurality of image capture devices 504, for each calibration measurement made by the plurality of image capture devices 504, etc.), a 2D strain tensor. For example, the strain at the location of each set of strain gauges on the support structure over the period of time may be measured as a series of strain tensors corresponding to the series of images of the calibration target, and each strain tensor of the series of strain tensors may be measured with six degrees of freedom.

As shown in FIG. 4, at step 406, process 400 includes capturing a series of images of a calibration target. For example, and referring also to FIG. 7, each image capture device 504 of the plurality of image capture devices 506 may capture, simultaneous to the application of the random mechanical excitation to the support structure 502, a series of images of a calibration target 702 (e.g., a target with a checkerboard pattern, etc.). As an example, each image capture device 504 of the plurality of image capture devices 506 may capture, for each time stamp of a series of time stamps (e.g., for each strain tensor of a series of strain tensors measured by the plurality of strain sensors 506, etc.), an image of the calibration target 702. In such an example, a computing device may convert an image from each image capture device 504 corresponding to a same time stamp into a difference or displacement in six degrees of freedom between the plurality of image capture devices 504 using existing camera calibration techniques, as should be understood by those of ordinary skill in the art.

In some non-limiting embodiments or aspects, additionally, or alternatively, to capturing a series of images of a calibration target, a digital image correlation system and/or an array of displacement sensors may be configured to measure a difference or displacement in six degrees of freedom between the plurality of image capture devices 504, or may be used to improve a mapping between the measured strain and the displacement between image capture devices 504. A mathematical relationship between displacement and calibration error in the camera signal may be applied to this external measurement of displacement to relate the measurement to the calibration between the image capture devices 504.

As shown in FIG. 4, at step 408, process 400 includes generating a mapping between the strain and a calibration parameter. For example, a computer system (e.g., computer system 900, etc.) may generate a mapping between the strain measured by each set of strain gauges 506 and a displacement between the plurality of image capture devices 504. As an example, a computer system may generate, based on the strain measured over the period of time by each set of strain gauges and the series of images of the calibration target captured by each image capture device 504 (e.g., the difference or displacement in six degrees of freedom between the plurality of image capture devices 504, etc.), a mapping between the strain measured by each set of strain gauges 506 and a displacement (e.g., in six degrees of freedom, etc.) between the plurality of image capture devices 504. In such an example, because the excitation applied to the support structure 502 is random, a robust mapping that is applicable across a wide array of strain states may be generated.

In such an example, the computing device may receive the strain measured over the period of time, at the location of each set of strain gauges of the plurality of sets of strain gauges 506 coupled to the support structure 502, simultaneous to the application of the random mechanical excitation to the support structure 502 over the period of time; and receive image data associated with the series of images of the calibration target 702 captured, by each image capture device of the plurality of image capture devices 402, simultaneous to the application of the random mechanical excitation to the support structure 502.

A linearized, analytical model for the generated mapping may only be possible for very simple geometries and well known materials, and only under certain load conditions. For example, a computer system may use one or more of the following techniques to generate the mapping: a classical statistical learning technique, a machine learning technique (e.g., a linear regression, a neural network, a recursive neural network, etc.), a hybrid method that incorporates a physics-based model of the support structure 502 with calibration-derived parameters, or any combination thereof. As an example, the generated mapping may include a machine learning model, and a computer system may generate the mapping by training the machine learning model according to a machine learning algorithm using the strain measured over the period of time by each set of strain gauges and the series of images captured by each image capture device (and/or the difference or displacement in six degrees of freedom between the plurality of image capture devices 504) to generate a predicted displacement between the plurality of image capture devices for an input strain (e.g., an input strain tensor, etc.). Accordingly, once the mapping or model is learned or trained, the mapping or model may be used in real-time to provide online compensation for displacements of the plurality of image capture devices 504 based solely on input strain measurements from the plurality of sets of strain gauges 506.

As shown in FIG. 4, at step 410, process 400 includes capturing one or more further images. For example, each image capture device 504 may capture one or more further images. As an example, each image capture device 504 may capture one or more further images of an environment surrounding the plurality of image capture devices 504.

As shown in FIG. 4, at step 412, process 400 includes measuring a further strain. For example, each set of strain gauges 506 may measure, simultaneous to capturing the one or more images with each image capture device, a further strain. As an example, each set of strain gauges 506 may measure, at a time at which each image of the one or more further images are captured by the plurality of image capture devices 504, a further 2D strain tensor.

As shown in FIG. 4, at step 414, process 400 includes applying the mapping to the one or more further strain tensor(s) to generate a motion compensation parameter for calibrating the one or more further images. For example, a computer system (e.g., computer system 900, etc.) may apply the mapping to the further strain measured by each set of strain gauges 506 to generate a motion compensation parameter associated with a predicted displacement between the plurality of image capture devices 504 for calibrating the one or more further images captured by each image capture device 504. As an example, a computer system may apply the mapping to a further 2D strain tensor measured by each set of strain gauges 506 at a time corresponding to the time at which a corresponding image of the one or more further images are captured by the plurality of image capture devices 504 to generate a motion compensation parameter for calibrating the corresponding image. In such an example, the motion compensation parameter may include a predicted displacement (e.g., in six degrees of freedom, etc.) between the plurality of image capture devices 504 at the time corresponding to the time at which that further 2D strain tensor is measured and that corresponding image is captured.

In such an example, the computing device may receive further image data associated with the one or more further images captured by each image capture device 504; and receive a further strain measured, by each set of strain gauges 506, simultaneous to the capture of the one or more images by each image capture device 504.

As shown in FIG. 4, at step 416, process 400 includes correcting, using the motion compensation parameter, a distortion between the one or more further images. For example, a computer system (e.g., computer system 900, etc.) may correct, using the motion compensation parameter, a distortion between the one or more further images captured by each image capture device. As an example, a computer system may correct, based on the motion compensation parameter, a distortion between the one or more further images captured by each image capture device using existing image processing techniques, which may include a possibly nonlinear modification to the initial calibration generated, and which may be used by subsequent processes, such as object recognition and/or motion planning.

Figure 9:
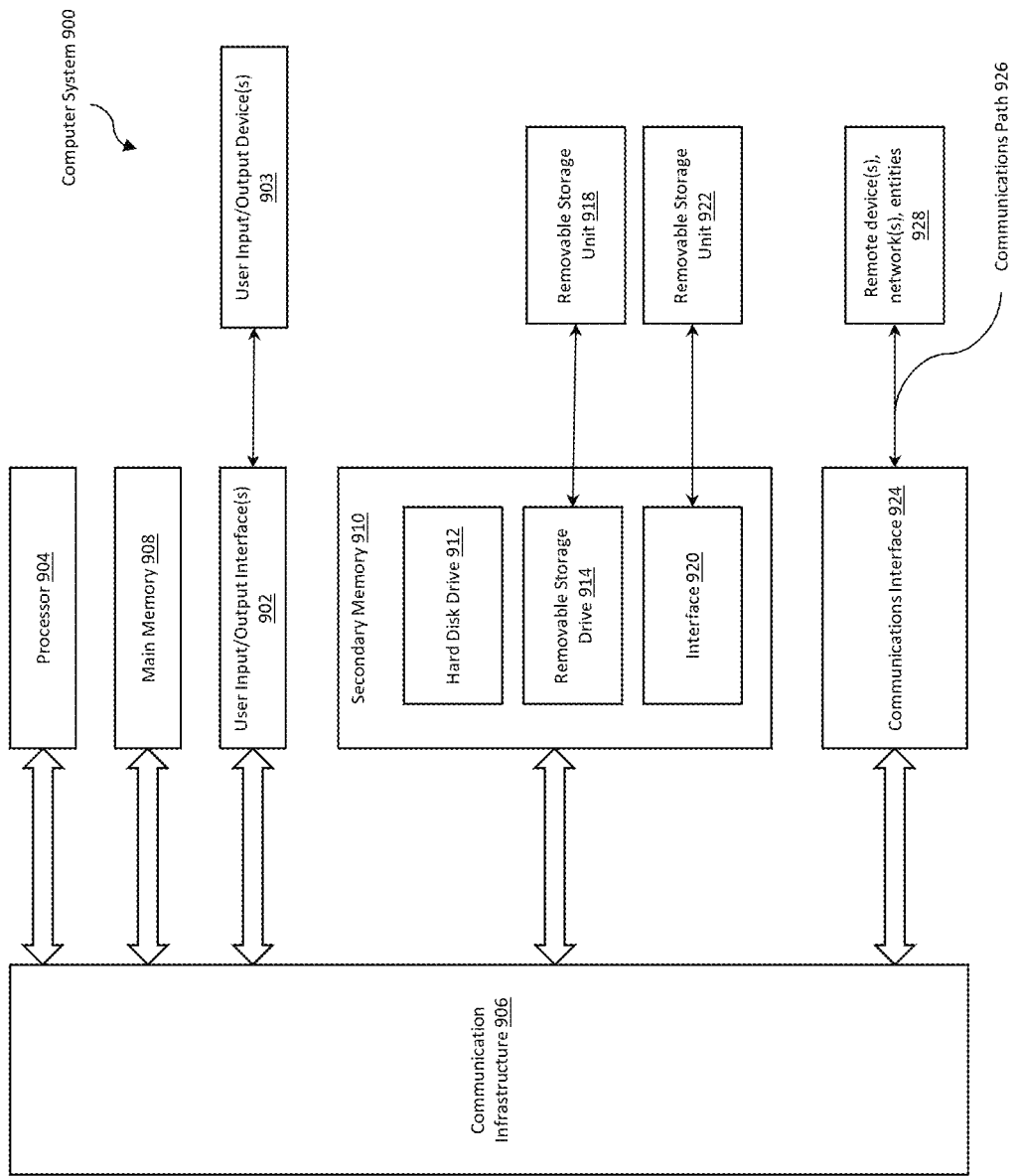
FIG. 9 is an example computer system useful for implementing various embodiments.

Various embodiments can be implemented, for example, using one or more computer systems, such as computer system 900 shown in FIG. 9. Computer system 900 can be any computer capable of performing the functions described herein.

Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/or any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible, non-transitory apparatus or article of manufacture comprising a tangible, non-transitory computer usable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for a vehicle, comprising:
    applying, via a vibration exciter, a random mechanical excitation to a support structure of the vehicle over a period of time, wherein a plurality of image capture devices and a plurality of sets of strain gauges are coupled to the support structure, and wherein the plurality of image capture devices are calibrated to each other before applying the random mechanical excitation to the support structure;
    measuring, with each set of strain gauges of the plurality of sets of strain gauges, simultaneous to the application of the random mechanical excitation to the support structure, a strain at a location of each set of strain gauges on the support structure over the period of time;
    capturing, with each image capture device of the plurality of image capture devices, simultaneous to the application of the random mechanical excitation to the support structure, image data associated with a series of images of a calibration target; and
    generating, with at least one processor, based on the strain measured at a location of each set of strain gauges on the support structure over the period of time by each set of strain gauges and the series of images of the calibration target captured by each image capture device, a mapping between the strain measured by each set of strain gauges and a displacement between the plurality of image capture devices.

2. The method of claim 1, further comprising:
    capturing, with each image capture device, one or more further images;
    measuring, with each set of strain gauges, simultaneous to capturing the one or more images with each image capture device, a further strain at the location of each set of strain gauges on the support structure;
    applying, with the at least one processor, the mapping to the further strain measured by each set of strain gauges to generate a motion compensation parameter associated with a predicted displacement between the plurality of image capture devices for calibrating the one or more further images captured by each image capture device; and
    correcting, with the at least one processor, using the motion compensation parameter, a distortion between the one or more further images captured by each image capture device.

3. The method of claim 1, wherein each set of strain gauges includes three strain gauges, and wherein the three strain gauges are in a delta-rosette configuration.

4. The method of claim 1, wherein the plurality of image capture devices includes at least three image capture devices.

5. The method of claim 1, wherein the support structure includes a first face facing in a first direction and a second face facing in a second direction different than the first direction, wherein at least one first set of strain gauges of the plurality of sets of strain gauges is coupled to the first face of the support structure, and wherein at least one second set of strain gauges of the plurality of sets of strain gauges is coupled to the second face of the support structure.

6. The method of claim 1, wherein the mapping includes a machine learning model, and wherein generating the mapping includes training the machine learning model using the strain measured over the period of time by each set of strain gauges and the series of images captured by each image capture device to generate a predicted displacement between the plurality of image capture devices.

7. The method of claim 1, wherein the strain at the location of each set of strain gauges on the support structure over the period of time is measured as a series of strain tensors corresponding to the series of images of the calibration target, and wherein each strain tensor of the series of strain tensors is measured with six degrees of freedom.

8. A system for a vehicle, comprising:
    a support structure mounted on the vehicle;
    a plurality of image capture devices coupled to the support structure;
    a plurality of sets of strain gauges coupled to the support structure;
    a vibration exciter configured to apply a random mechanical excitation to the support structure;
    a memory; and
    at least one processor coupled to the memory and configured to:
        receive a strain measured over a period of time, at a location of each set of strain gauges of the plurality of sets of strain gauges coupled to the support structure, simultaneous to an application of the random mechanical excitation to the support structure over the period of time, wherein the plurality of image capture devices are calibrated to each other before the random mechanical excitation is applied to the support structure;

receive image data associated with a series of images of a calibration target captured, by each image capture device of the plurality of image capture devices, simultaneous to the application of the random mechanical excitation to the support structure; and generate, based on the strain measured over the period of time by each set of strain gauges and the image data associated with the series of images of the calibration target captured by each image capture device, a mapping between the strain measured by each set of strain gauges and a displacement between the plurality of image capture devices.

9. The system of claim 8, wherein the at least one processor coupled to the memory is further configured to:

receive further image data associated with one or more further images captured by each image capture device;

receive a further strain measured, by each set of strain gauges, simultaneous to the capture of the one or more images by each image capture device;

apply the mapping to the further strain measured by each set of strain gauges to generate a motion compensation parameter associated with a predicted displacement between the plurality of image capture devices for calibrating the one or more further images captured by each image capture device; and correct, using the motion compensation parameter, a distortion between the one or more further images captured by each image capture device.

10. The system of claim 8, wherein each set of strain gauges includes three strain gauges, and wherein the three strain gauges are in a delta-rosette configuration.

11. The system of claim 8, wherein the plurality of image capture devices includes at least three image capture devices.

12. The system of claim 8, wherein the support structure includes a first face facing in a first direction and a second face facing in a second direction different than the first direction, wherein at least one first set of strain gauges of the plurality of sets of strain gauges is coupled to the first face of the support structure, and wherein at least one second set of strain gauges of the plurality of sets of strain gauges is coupled to the second face of the support structure.

13. The system of claim 8, wherein the mapping includes a machine learning model, and wherein generating the mapping includes training the machine learning model using the strain measured over the period of time by each set of strain gauges and the image data associated with the series of images captured by each image capture device to generate a predicted displacement between the plurality of image capture devices.

14. The system of claim 8, wherein the strain at the location of each set of strain gauges on the support structure over the period of time is measured as a series of strain tensors corresponding to the series of images of the calibration target, and wherein each strain tensor of the series of strain tensors is measured with six degrees of freedom.

15. A non-transitory computer-readable medium having instructions stored thereon that, when executed by at least one computing device of a vehicle, cause the at least one computing device to perform operations comprising:

applying, via a vibration exciter, a random mechanical excitation to a support structure connected to the vehicle;

receiving a strain measured over a period of time, at a location of each set of strain gauges of a plurality of sets of strain gauges coupled to the support structure, simultaneous to an application of the random mechanical excitation to the support structure over the period of time, wherein a plurality of image capture devices are coupled to the support structure, and wherein the plurality of image capture devices are calibrated to each other before the random mechanical excitation is applied to the support structure;

receiving image data associated with a series of images of a calibration target captured, by each image capture device of the plurality of image capture devices, simultaneous to the application of the random mechanical excitation to the support structure;

generating, based on the strain measured over the period of time by each set of strain gauges and the image data associated with the series of images of the calibration target captured by each image capture device, a mapping between the strain measured by each set of strain gauges and a displacement between the plurality of image capture devices;

receiving further image data associated with one or more further images captured by each image capture device;

receiving a further strain measured, by each set of strain gauges, simultaneous to the capture of the one or more images by each image capture device;

applying the mapping to the further strain measured by each set of strain gauges to generate a motion compensation parameter associated with a predicted displacement between the plurality of image capture devices for calibrating the one or more further images captured by each image capture device; and correcting, using the motion compensation parameter, a distortion between the one or more further images captured by each image capture device.

16. The non-transitory computer-readable medium of claim 15, wherein each set of strain gauges includes three strain gauges, and wherein the three strain gauges are in a delta-rosette configuration.

17. The non-transitory computer-readable medium of claim 15, wherein the plurality of image capture devices includes at least three image capture devices.

18. The non-transitory computer-readable medium of claim 15, wherein the support structure includes a first face facing in a first direction and a second face facing in a second direction different than the first direction, wherein at least one first set of strain gauges of the plurality of sets of strain gauges is coupled to the first face of the support structure, and wherein at least one second set of strain gauges of the plurality of sets of strain gauges is coupled to the second face of the support structure.

19. The non-transitory computer-readable medium of claim 15, wherein the mapping includes a machine learning model, and wherein generating the mapping includes training the machine learning model using the strain measured over the period of time by each set of strain gauges and the image data associated with the series of images captured by each image capture device to generate a predicted displacement between the plurality of image capture devices.

20. The non-transitory computer-readable medium of claim 15, wherein the strain at the location of each set of strain gauges on the support structure over the period of time is measured as a series of strain tensors corresponding to the series of images of the calibration target, and wherein each strain tensor of the series of strain tensors is measured with six degrees of freedom.

* * * * *